United States Patent
Dai et al.

(10) Patent No.: US 10,546,024 B2
(45) Date of Patent: Jan. 28, 2020

(54) METHOD AND DEVICE FOR SEARCHING CHARACTER STRING

(71) Applicant: EMC IP Holding Company LLC, Hopkinton, MA (US)

(72) Inventors: Duke Hongtao Dai, Shanghai (CN); Winston Lei Zhang, Shanghai (CN); Chao Chen, Shanghai (CN); Kun Wu Huang, Shanghai (CN); Jingjing Liu, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 317 days.

(21) Appl. No.: 15/463,010

(22) Filed: Mar. 20, 2017

(65) Prior Publication Data

US 2017/0270114 A1    Sep. 21, 2017

(30) Foreign Application Priority Data

Mar. 18, 2016 (CN) .......................... 2016 1 0158006

(51) Int. Cl.
*G06F 16/93* (2019.01)
*G06F 16/33* (2019.01)
*G06F 16/903* (2019.01)

(52) U.S. Cl.
CPC ............ *G06F 16/93* (2019.01); *G06F 16/334* (2019.01); *G06F 16/90344* (2019.01)

(58) Field of Classification Search
None
See application file for complete search history.

(56) References Cited

U.S. PATENT DOCUMENTS

| | | | |
|---|---|---|---|
| 6,240,409 B1 * | 5/2001 | Aiken | G06F 17/2211 |
| 7,272,602 B2 | 9/2007 | Moulton | |
| 8,365,247 B1 | 1/2013 | Wiese et al. | |
| 8,627,479 B2 | 1/2014 | Wittenstein et al. | |
| 8,756,684 B2 | 6/2014 | Frantz et al. | |
| 2013/0151503 A1 * | 6/2013 | Pfeifle | G06F 16/2468 707/716 |
| 2013/0325881 A1 * | 12/2013 | Deshpande | G06F 16/33 707/755 |

OTHER PUBLICATIONS

Havre et al, Interactive Visualization of Multiple Query Results, 2001, IEEE Symposium on Information Visualization, pp. 1-8 (Year: 2001).*

* cited by examiner

*Primary Examiner* — James Trujillo
*Assistant Examiner* — Cheryl M Shechtman
(74) *Attorney, Agent, or Firm* — BainwoodHuang (57) ABSTRACT

Techniques for searching a character string involve: determining a first set of documents including a first token in the character string, and a second set of documents including a second token in the character string; and generating a third set of documents based on the first and second sets of documents, in the third set of documents: i) a document being included in the first and second sets of documents, and ii) a distance between the first and second tokens in the document being equal to a distance between the first and second tokens in the character string.

20 Claims, 4 Drawing Sheets

METHOD AND DEVICE FOR SEARCHING CHARACTER STRING

RELATED APPLICATIONS

This application claim priority from Chinese Patent Application Number CN201610158006.0, filed on Mar. 18, 2016 at the State Intellectual Property Office, China, titled "Method and Device for Searching Character String" the contents of which is herein incorporated by reference in its entirety.

FIELD

Embodiments of the present disclosure generally relate to the field of information search, and more specifically, to a method and device for searching a character string.

BACKGROUND

In information search, search technologies such as inversed indexing may be used to search a given character string in mass documents (such as webpages on the Internet). In a conventional inversed indexing technology, a character string to be searched is divided into tokens. Here, the term "token" refers to a unit composing a character string, such as a character, a word, a phrase, and the like. During the search, all documents including all tokens will be searched.

A biggest issue that this search faces is searching efficiency. It may be understood that for each token in the character string, there may be the considerable numbers of documents including the token. By contrast, in each document, each token may appear many times. A conventional search engine has to process all of these tokens in all documents. This significantly lowers the searching efficiency, which causes the search of the character string to become a time-consuming process. A sluggish response in turn degrades experiences of users who use the search engine.

SUMMARY

Generally, embodiments of the present disclosure provide a method and device for searching a character string.

According to a first aspect of the present disclosure, there is provided a method of searching a character string, comprising: determining a first set of documents including a first token in the character string, and a second set of documents including a second token in the character string; and generating a third set of documents based on the first and second sets of documents, in the third set of documents: i) a document being included in the first and second sets of documents, and ii) a distance between the first and second tokens in the document being equal to a distance between the first and second tokens in the character string.

According to a second aspect of the present disclosure, there is provided an device for searching a character string, comprising: a processing unit configured to determine a first set of documents including a first token in the character string, and a second set of documents including a second token in the character string; and generate a third set of documents based on the first and second sets of documents, in the third set of documents: i) a document being included in the first and second sets of documents, and ii) a distance between the first and second tokens in the document being equal to a distance between the first and second tokens in the character string.

According to a third aspect of the present disclosure, there is provided a computer program product. The computer program product is tangibly stored on a non-transient computer readable medium and includes machine-executable instructions, which, when executed, cause a machine to perform steps of the method according to the first aspect of the present disclosure.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Through the following detailed description with reference to the accompanying drawings, the above and other features, advantages, and aspects of embodiments of the present disclosure will become more apparent. In the accompanying drawings, same or similar reference numerals represent same or similar elements, in which.

In the drawings, same or similar reference numerals represent same or similar elements.

DETAILED DESCRIPTION OF EMBODIMENTS

Hereinafter, embodiments of the present disclosure will be described in more details with reference to the accompanying drawings. Although some embodiments of the present disclosure are illustrated in the drawings, it is to be understood that the present disclosure may be implemented through various forms, but may not be interpreted as being limited to the embodiments illustrated herein. On the contrary, these embodiments are only intended for a more thorough and complete understand of the present disclosure. It is to be understood that the accompanying drawings and embodiments of the present disclosure are only for the purpose of illustration, without suggesting any limitation of the protection scope of the present disclosure.

As used herein, the term "comprises," "includes" and their variants are to be read as open terms that mean "includes, but is not limited to." The term "based on" is to be read as "based at least in part on." The term "one embodiment" may be read as "at least one embodiment." The term "another embodiment" may be read as "at least one other embodiment." Relevant definitions of other terms will be provided below.

As described above, in the conventional search technology, all documents including all tokens in a character string to be searched are searched. However, the number of documents as search objects is usually considerable, while the numbers of tokens included in each document may be up to millions. Therefore, the conventional search technology always requires a massive computation, which causes the entire searching process rather time-consuming.

In order to solve these and other potential problems, embodiments of the present disclosure provide a method for searching a character string search. In the method, a new set of documents is generated based on two sets of documents including two tokens in the character string. The new set of documents is included in the two sets of documents, and the distance between the two tokens in each document of the new set of documents is equal to the distance between the two tokens in the character string. In this way, the search of the character string may be implemented based on the new set of documents. This search approach effectively reduces the number of documents that need to be searched, thereby significantly reducing computation required during the search and enhancing the search performance.

Figure 1:
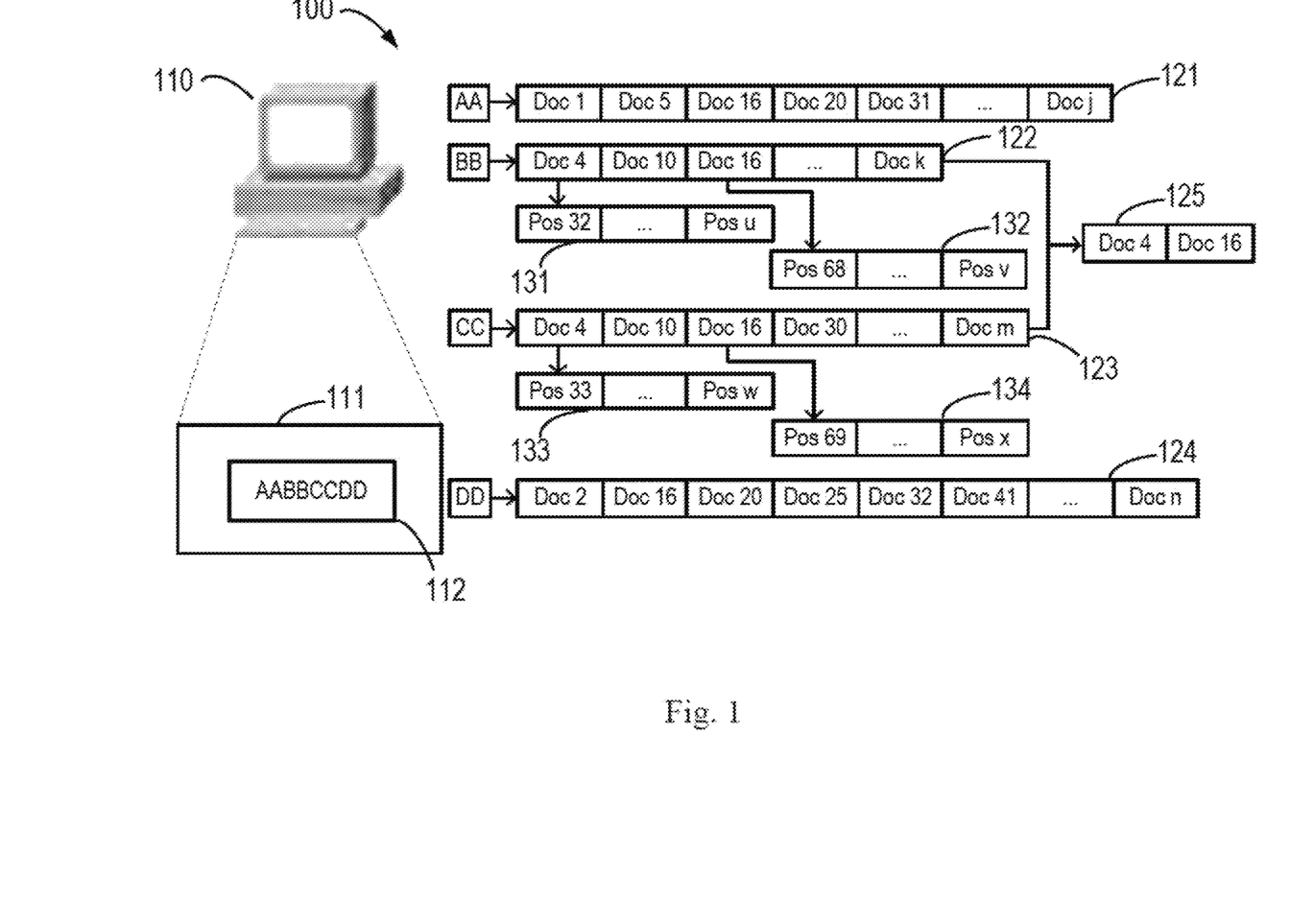
FIG. 1 shows an example environment in which embodiments of the present disclosure may be implemented.

A general principle of embodiments of the present disclosure will be first described with reference to FIG. 1. FIG. 1 shows an example environment 100 in which the embodiments of the present disclosure may be implemented. A computing device 110 may be any suitable device having a function of searching a character string. Examples of the computing device 110 include, but are not limited to: a server, a personal computer (PC), a laptop computer, a tablet computer, a personal digital assistant (PDA), a mobile phone, a smart phone, smart glasses, a smart watch, and the like.

As shown, the computing device 110 may present to a user a user interface (UI) 111, such as a graphical user interface (GUI). The UI 111 displays a field 112 for the user to input a character string to be searched. The computing device 110 may receive the character string to be searched that is inputted by the user via a keyboard, a handwriting input or a voice input. It is to be understood that the user interface 111 is only illustrative, without suggesting any limitation of the scope of the present disclosure. In an alternative embodiment, the character string to be searched may be received, for example, by another computing device (not shown) and provided to the computing device 110.

After obtaining the character string to be searched, the computing device 110 may split the character string into a plurality of tokens and for each of the tokens, determine a set of documents including the token. According to the embodiments of the present disclosure, the computing device 110 may merge two sets of documents including two tokens into a new set of documents, such that each document in the new set of documents will include the two tokens, and a distance between the two tokens in each of the documents is equal to a distance between the two tokens in the character string. In some embodiments, the merging operation may start from two sets of documents that, for example, include the minimum numbers of documents, which will be detailed in the following paragraphs.

As shown, it is supposed that the user inputs a character string "AABBCCDD" 12. The computing device 110 first segments the character string into tokens, such as "AA," "BB," "CC," and "DD," according to a given segmentation approach of a character string. This is only illustrative, without suggesting any limitation of the scope of the present disclosure in any way. Any segmentation algorithm of a character string that is currently known or will be developed in the further may be used in conjunction with the embodiments of the present disclosure.

For each token, a set of documents including the token may then be determined. Thereby, four sets of documents 121, 122, 123, and 124 may be obtained. The documents in the set of documents 121 include the token "AA," the documents in the set of documents 122 of include the token "BB," documents in the set of documents 123 include the token "CC," and the documents in the set of documents 124 include the token "DD." In some embodiments, the four sets of documents 121, 122, 123, and 124 may be stored in a storage unit of the computing device 110 in a form of lists. Any other suitable data structures are also possible.

Next, the computing device 110 selects two or more sets out of the sets of documents according to a predetermined criterion. As described above, an example criterion of the document selection is sizes of the sets of documents. For example, the computing device 110 may initially select two or more sets of documents including the less (for example, the least) numbers of documents. For the purpose of discussions, it is supposed that the sets of documents 122 and 123 of are first selected. The selected sets of documents 122 and 123 are then merged into a new set of documents 125. A general principle of the merging is that for each document in the new set 125: (1) the document is simultaneously in the sets of documents 122 and 123, that is, simultaneously including the tokens "BB" and "CC;" and (ii) a distance between the tokens BB and CC in the document is equal to the distance between the tokens in the character string 112. A metric of a distance between tokens will be described in the following paragraphs. According to this principle, in this example, documents 4 and 16 will be included into the new set of documents 125.

Figure 2:
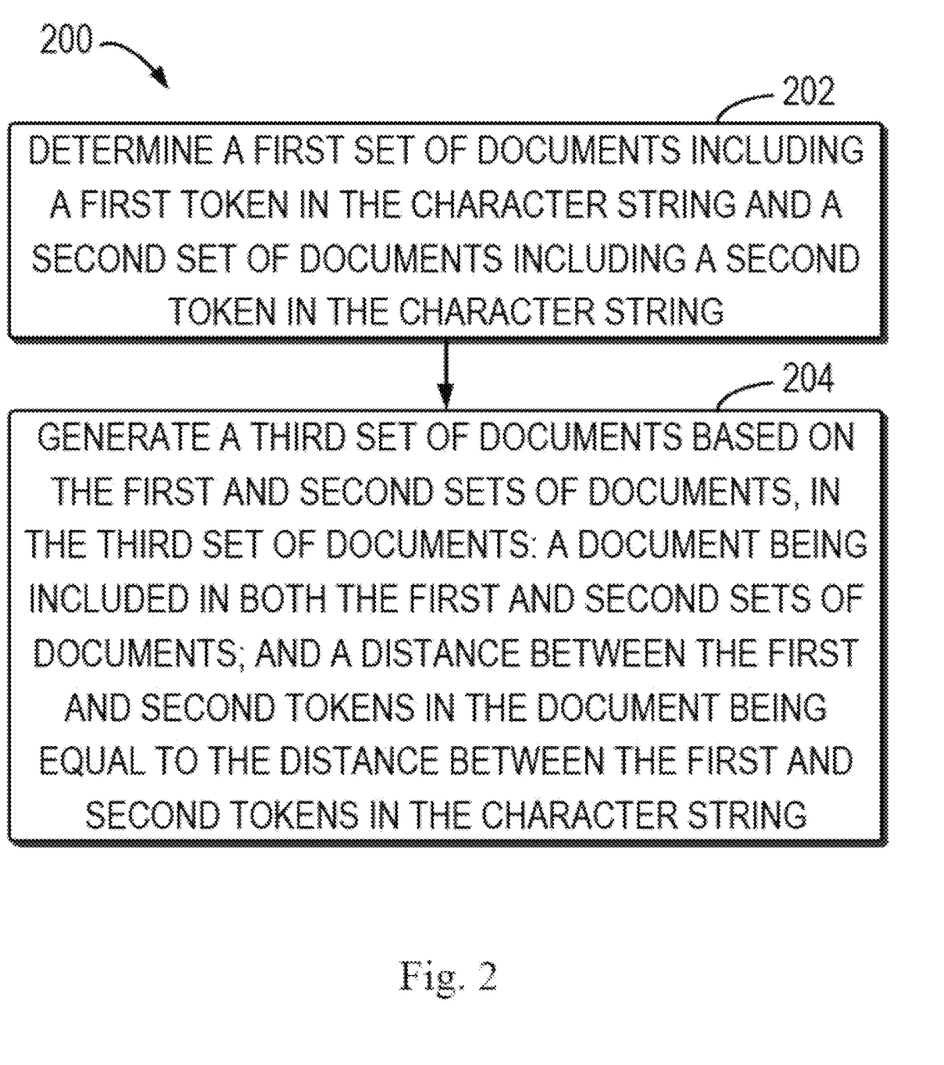
FIG. 2 shows a flow diagram of a method for searching a character string according to some embodiments of the present disclosure.

By merging the documents in this way, the search efficiency may be significantly enhanced. A process of the merging and effects thereof will be described below in details in conjunction with several examples. FIG. 2 illustrates a process of searching a character string according to embodiments of the present disclosure. The method 200 as shown in FIG. 2 may be implemented by the computing device 110. For the purpose of discussions, the method 200 may be described with reference to FIG. 1.

As shown in FIG. 2, in step 202, the computing device 110 determines a first set of documents including a first token in the character string (such as "AABBCCDD" in FIG. 1) to be searched, and a second set of documents including a second token in the character string. The "first" and "second" tokens, such as "BB" and "CC" in the example as shown in FIG. 1, are selected from a plurality of tokens included in the character string.

As described above, the first and second tokens may be selected according to various criteria. For example, the first and second tokens may be determined in an ascending order of the numbers of documents in the sets of documents. In other words, the sets of documents corresponding to the individual tokens may be first sorted according to the numbers of documents included in these sets of documents. Then, a set of documents including the less number of documents may be selected. In particular, in one embodiment, two or more sets of documents including the least numbers of documents may be selected. In this way, the amount of computation in the merging of the sets of documents and subsequent processing as will be described in the following paragraphs may be significantly reduced. It is to be understood that the selection of the sets of documents with the least numbers of documents is only an example, and other approaches of the selection are also possible. For example, a set of documents may be randomly selected for merging, or a set of documents including the larger number of documents may be selected for merging.

The method 200 proceeds to step 204 in which a third set of documents are generated based on the first and second sets of documents. Any document in the third set of documents should satisfy the following conditions: i) the document is included in both the first and second sets of documents, and ii) a distance between the first and second tokens in the document is equal to the distance between the first and second tokens in the character string.

Still with reference to the example of FIG. 1, when merging the set of documents 122 corresponding to the first token "BB" and the set of documents 123 corresponding to the second token "CC," the following two conditions should be considered. First, each document in the new set of documents 125 should be included in the sets of documents 122 and 123. In other words, a document in the set of documents 125 should simultaneously include the first token "BB" and the second token "CC." Second, the distance between the token "BB" and the token "CC" in the set of documents 125 should be equal to a distance between the two tokens in the character string "AABBCCDD" to be searched. The distance in the character string may be implemented as a metric in various approaches, such as a Euclidean distance, a Hamming distance, and the like. As an example, if two tokens are immediately adjacent to each other, the distance between these tokens is 1; and so on.

In some embodiments, each document in a set of documents corresponding to each token may have a position list that records positions of the token in the document. In the example as shown in FIG. 1, in the set of documents 122 including the first token "BB," the documents 4 and 16 respectively have position lists 131 and 132, for example. The position list 32 is taken as an example, which indicates that the token "BB" appears in a position 32, . . . , and a position u of the document 4. By searching such a position list, positions of a token in a document, as well as a distance between different tokens in any document, may be quickly determined. Of course, this is unnecessary. In some embodiments, the distance between tokens may be calculated during running.

In some embodiments, in step 204, the above two conditions may be applied sequentially. In the example as described in FIG. 1, an intersection between the sets of documents 122 and 123 may be first obtained, for example. The documents in the intersection include both of the tokens "BB" and "CC." There are a lot of approaches to determine the intersection. For example, the set of documents 123 may be screened by using the set of documents 122 as a baseline. If a certain document in the set of documents 122 is not included in the set of documents 123, the document may be removed from the set of documents 122. The elements finally reserved form an intersection between the sets of documents 122 and 123. A document included in the intersection is referred to as a "candidate document." The second condition may be applied to the candidate documents in the intersection to determine in which candidate document, the distance between "BB" and "CC" is identical to the distance between the two tokens in the character string 112. Those candidate documents satisfying the second condition form the third set of documents 125.

Alternatively, the above two conditions may be simultaneously applied when scanning the sets of documents. For example, after determining that a certain document is included in the sets of documents 122 and 123, it may then be determined whether the distance between the tokens "BB" and "CC" in the document is equal to the distance between the two tokens in the character string 112. If so, the document is added into the third set of documents 125. Otherwise, the document may be directly excluded from subsequent processing.

Optionally, in some embodiments, after the third set of documents are generated, steps 202 and 204 may be repetitively performed for many times based on the third set of documents so as to implement further merging of the sets of documents. For example, a fourth set of documents including a third token in the character string may be determined, and by merging the third and fourth sets of documents, a fifth set of documents are generated. Similar to the merging principle described above, a document in the fifth set of documents should satisfy the following conditions: the document is included in both of the third and fourth sets of documents, and a distance between the first and third tokens in the document is equal to a distance between the first and third tokens in the character string, and a distance between the second and third tokens in the document is equal to a distance between the second and third tokens in the character string.

Similar to the process of determining the first and second sets of documents, any other sets of documents may be selected as the fourth set of documents. In some embodiments, a set of documents with the less number of documents from among the currently remaining sets of documents may be selected as the fourth set of documents. In the example of FIG. 1, when two sets of documents 122 and 123 with the least numbers of documents have been selected to generate the third set of documents 125, the set of documents 121 with the third least number of documents may, for example, be selected to be merged with the third set of documents 125 in a next round. The principle and specific procedure of the merging have been detailed above, which thus will not be repeated here.

In some embodiments, the process of generating new sets of documents may be continued until a document including all the tokens in the character string to be searched is found. Alternatively, in some embodiments, this merging may be suspended after the given condition is satisfied, and then a normal search process will be performed. For example, this merging may be stopped when the number of documents in a new set of documents is less than a predetermined threshold. Alternatively or in addition, the merging may also be suspended after the performed rounds of the merging exceed the predetermined number of rounds, and so on. The normal searching process is known in the art, which will not be discussed here.

Figure 3:
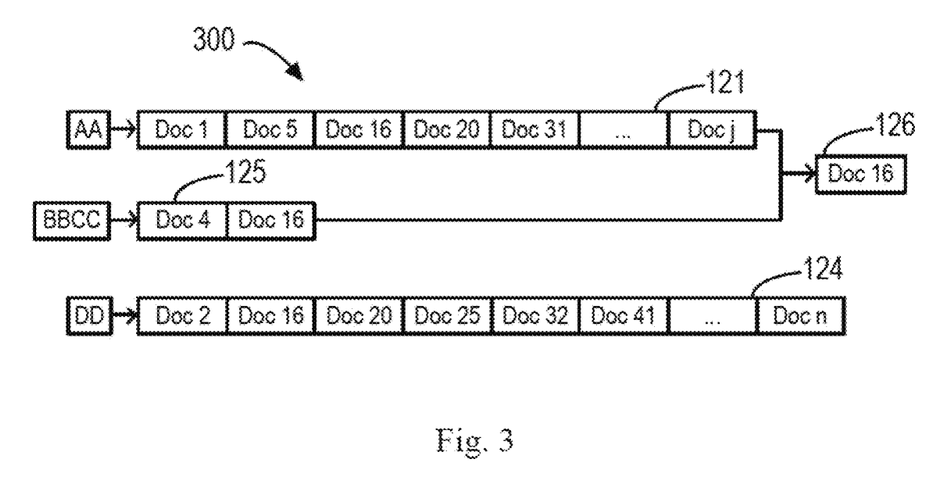
FIG. 3 shows an example process of generating a set of documents during the search of the character string according to some embodiments of the present disclosure.

FIG. 3 shows an example process of generating sets of documents during the search of a character string according to some embodiments of the present disclosure. The example process as shown in FIG. 3 may be regarded as an example subsequent implementation of the process of generating the set of documents as shown in FIG. 1. It has been described above with reference to FIG. 1 that the computing device 110 generates a new set of documents 125 based on the sets of documents 122 and 123 having the least numbers of documents among the sets of documents 121, 122, 123 and 124. The newly generated set of documents 125 includes the documents 4 and 16.

Next, as illustrated in FIG. 3, the generation of the new sets of documents will be continued based on the third set of documents 125. In this example, because the number of documents in the set of documents 121 is less than that in the set of documents 124, the fourth set of documents 121 is used together with the third set of documents 125 to generate a new fifth set of documents 301. Because the set of documents 121 includes the document 16, but excludes the document 4, the newly generated set of documents 301 only includes the document 16. Till now, the process of generating the new set of documents stops, and a normal search process is performed. For example, the character string "AABBCCDD" is directly searched in the document 16, or based on the associated set of positions, it is determined whether the document 16 includes "AA," "BB" "CC" and "DD" with continuous positions. According to embodiments of the present disclosure, by means of this gradual merging of the sets of documents, the search efficiency may be significantly improved, response time may be reduced, and thereby user experiences may be improved.

Figure 4:
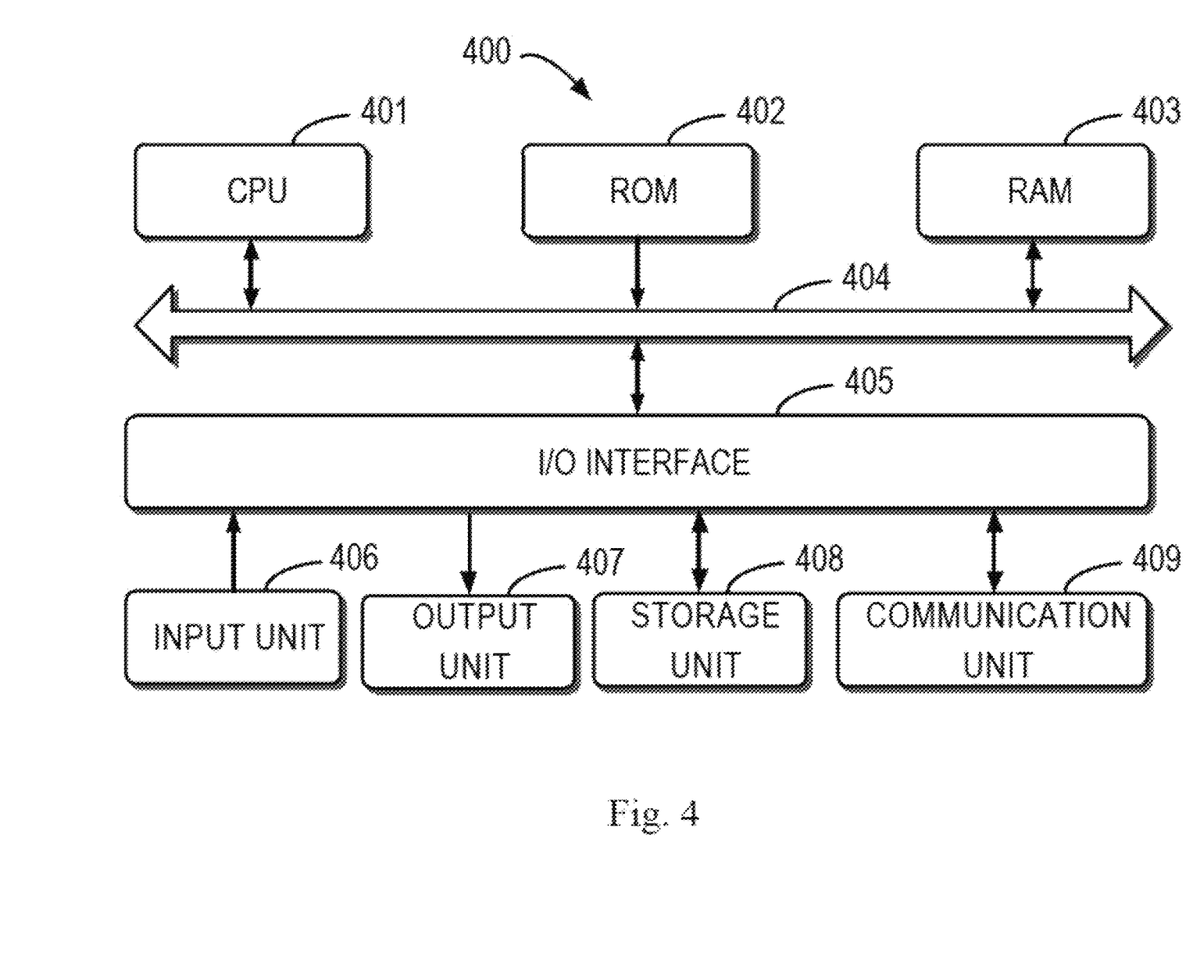
FIG. 4 shows an example block diagram of a computing device adapted to implement the embodiments of the present disclosure.

FIG. 4 illustrates a schematic diagram of a computing device 400 adapted to implement the embodiments of the present disclosure. As shown in FIG. 4, the computing device 400 comprises a central processing unit (CPU) 401 which may perform various suitable actions and processing according to computer program instructions stored in a read-only memory (ROM) 402 or computer program instructions loaded into a random access memory (RAM) 403 from a memory unit 408. In the RAM 403, there may also store various types of programs and data required for operations of the device 400. The CPU 401, ROM 402, and RAM 403 are connected with each other via a bus 404. An input/output (I/O) interface 405 may also be connected to the bus 404.

A plurality of components in the computing device 400 are connected to the I/O interface 405, including: an input unit 406, such as a keyboard, a mouse, and the like; an output unit 407, such as various types of displays, loudspeakers, and the like; a storage unit 408, such as a magnetic disk, an optic disk, and the like; and a communication unit 409, such as a network card, a modem, a wireless communication transceiver, and the like. The communication unit 409 allows the device 400 to exchange information/data with other devices over a computer network such as Internet, and/or various types of telecommunication networks.

In some embodiments, the CPU 401 may be configured to execute various procedures and processing, such as the method 200, as described above. In some embodiments, the method 200 may be implemented, for example, as computer software program which is tangibly embodied in a machine readable medium, such as the storage unit 408. In some embodiments, a part or all of the computer programs may be loaded into and/or installed onto the computing device 400 via the ROM and/or the communication unit 409. When the computer program is loaded into the RAM and executed by the CPU 401, one or more steps in example method 200 as described above may be performed.

Particularly, according to the embodiments of the present disclosure, the procedures above described with reference to FIGS. 1, 2 and 3a-3c may be implemented as computer program products, which may be tangibly stored on a non-transient computer readable medium and include machine-executable instructions which, when executed, cause a machine to implement various aspects of the present disclosure.

The computer readable storage medium may be a tangible device that may store instructions for use by an instruction execution device. The computer readable storage medium may include, but not limited to, for example, an electronic storage device, a magnetic storage device, an optical storage device, an electromagnetic storage device, a semiconductor storage device, or any suitable combination thereof. Non-exhaustive and more specific examples of the computer readable storage medium include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination thereof. A computer readable storage medium, as used herein, is not to be construed as being transitory signals per se, such as radio waves or other electromagnetic waves propagating freely, electromagnetic waves propagating through a waveguide or other transmission media (such as light pulses through an optical fiber cable), or electrical signals transmitted through a wire.

Computer readable program instructions for carrying out operations of the present disclosure may be assembly instructions, instruction-set-architecture (ISA) instructions, machine instructions, machine dependent instructions, microcode, firmware instructions, state-setting data, or either source codes or object codes written in any combination of one or more programming languages, including an object oriented programming language such as Smalltalk, C++ or the like, and conventional procedural programming languages, such as the "C" programming language or similar programming languages. The computer readable program instructions may be executed entirely on a user's computer, partly on the user's computer, as a stand-alone software package, partly on the user's computer and partly on a remote computer, or entirely on the remote computer or server. In the scenario involving the remote computer, the remote computer may be connected to the user's computer through any type of networks, including a local area network (LAN) or a wide area network (WAN), or connected to an external computer (for example, through the Internet using an Internet Service Provider). In some embodiments, state information of the computer readable program instructions may be utilized to customize electronic circuitry including, for example, programmable logic circuitry, field-programmable gate arrays (FPGA), or programmable logic arrays (PLA), which may execute the computer readable program instructions, in order to perform aspects of the present disclosure.

Aspects of the present disclosure are described herein with reference to block diagrams and/or flowcharts of devices, methods, and computer program products according to embodiments of the invention. It is to be understood that each block of the block diagrams and/or flowcharts and combinations of the blocks in the flowchart illustrations and/or block diagrams and/or flowcharts may be implemented by computer readable program instructions.

Various embodiments of the present disclosure have been described above for purpose of illustration. However, the present disclosure is not intended to be limited to these embodiments as disclosed. Without departing from essence of the present disclosure, all modifications and variations fall within the protection scope of a present disclosure as defined in the claims.

We claim:
1. A method of searching a character string, comprising:
   determining a first set of documents including a first token in the character string, and a second set of documents including a second token in the character string; and
   generating a third set of documents based on the first and second sets of documents, in the third set of documents:
   i) a document being included in both the first and second sets of documents, and
   ii) a distance between the first and second tokens in the document being equal to a distance between the first and second tokens in the character string.

2. The method according to claim 1, wherein the determining comprises:
   determining a plurality of sets of documents including a plurality of tokens in the character string; and
   selecting the first and second sets of documents from the plurality of sets of documents in an ascending order of the numbers of documents included in the plurality of sets of documents.

3. The method according to claim 1, wherein the generating a third set of documents comprises:
   selecting a candidate document included in both the first and second sets of documents;
   determining whether a candidate distance between the first and second tokens in the candidate document is equal to the distance between the first and second tokens in the character string; and
   adding the candidate document into the third set of documents in response to the candidate distance being equal to the distance.

4. The method according to claim 3, wherein the selecting comprises:
   obtaining an intersection of the first and second sets of documents; and
   selecting the candidate document from the intersection.

5. The method according to claim 3, wherein the determining whether a candidate distance is equal to the distance comprises:
   determining a first set of positions of the first token in the candidate document;
   determining a second set of positions of the second token in the candidate document; and
   determining, based on the first and second sets of positions, whether the candidate distance is equal to the distance between the first and second tokens in the character string.

6. The method according to claim 1, further comprising:
   determining a fourth set of documents including a third token in the character string;
   generating a fifth set of documents based on the third and fourth sets of documents, in the fifth set of documents:
   i) a document being included in both the third and fourth sets of documents, and
   ii) a distance between the first and third tokens in the document being equal to a distance between the first and third tokens in the character string, and a distance between the second and third tokens in the document being equal to a distance between the second and third tokens in the character string.

7. The method according to claim 1, further comprising: obtaining the first and second tokens by segmenting the character string.

8. The method according to claim 1, wherein the distance between the first and second tokens in the document is a Euclidian distance.

9. The method according to claim 1, wherein the distance between the first and second tokens in the document is a Hamming distance.

10. The method according to claim 1, wherein the distance between the first and second tokens in the document is one.

11. The method according to claim 1, wherein the first and second tokens are adjacent to each other.

12. The method according to claim 1, further comprising a position list that records the position of the token in the document.

13. An electronic device comprising:
    a processing unit configured to:
    determine a first set of documents including a first token in the character string, and a second set of documents including a second token in the character string; and
    generating a third set of documents based on the first and second sets of documents, in the third set of documents:
    i) a document being included in both the first and second sets of documents, and
    ii) a distance between the first and second tokens in the document being equal to a distance between the first and second tokens in the character string.

14. The device according to claim 13, wherein the processing unit is configured to:
    determine a plurality of sets of documents including a plurality of tokens in the character string; and
    select the first and second sets of documents from the plurality of set of documents in an ascending order of the numbers of documents included in the plurality of sets of documents.

15. The device according to claim 13, wherein the processing unit is configured to:
    Select a candidate document included in both the first and second sets of documents;
    determine whether a candidate distance between the first and second tokens in the candidate document is equal to the distance between the first and second tokens in the character string; and
    add the candidate document into the third set of documents in response to the candidate distance being equal to the distance.

16. The device according to claim 15, wherein the processing unit is configured to:
    obtain an intersection of the first and second sets of documents; and
    select the candidate document from the intersection.

17. The device according to claim 15, wherein the processing unit is configured to:
    determine a first set of positions of the first token in the candidate document;
    determine a second set of positions of the second token in the candidate document; and
    determine, based on the first and second sets of positions, whether the candidate distance is equal to the distance between the first and second tokens in the character string.

18. The device according to claim 13, wherein the processing unit is further configured to:
    determine a fourth set of documents including a third token in the character string;
    generate a fifth set of documents based on the third and fourth sets of documents, in the fifth set of documents:
    i) a document being included in both the third and fourth sets of documents, and
    ii) a distance between the first and third tokens in the document being equal to a distance between the first and third tokens in the character string, and a distance between the second and third tokens in the document being equal to a distance between the second and third tokens in the character string.

19. The device according to claim 13, wherein the processing unit is further configured to:
    obtain the first and second tokens by segmenting the character string.

20. A computer program product for searching a character string, the computer program product comprising:

a non-transitory computer readable medium encoded with computer-executable code, the code configured to enable the execution of:

determining a first set of documents including a first token in the character string, and a second set of documents including a second token in the character string; and generating a third set of documents based on the first and second sets of documents, in the third set of documents:
   i) a document being included in both the first and second sets of documents, and
   ii) a distance between the first and second tokens in the document being equal to a distance between the first and second tokens in the character string.

\* \* \* \* \*